United States Patent [19]

Lundahl

[11] 3,768,679
[45] Oct. 30, 1973

[54] ACCUMULATING CHAMBER FOR COMPACTING HAY WAGON
[75] Inventor: Ezra Cordell Lundahl, Idaho Falls, Idaho
[73] Assignee: Ezra C. Lundahl, Inc., Logan, Utah
[22] Filed: Nov. 4, 1971
[21] Appl. No.: 195,609

[52] U.S. Cl............... 214/519, 214/83.3, 214/152, 100/100
[51] Int. Cl. ........................ B60p 1/02, A01d 43/00
[58] Field of Search..................... 214/83.3, 519, 82; 100/100

[56] References Cited
UNITED STATES PATENTS
2,622,748  12/1952  Feldert............................. 214/83.3
2,695,110  11/1954  Feidert............................. 214/83.3
2,750,055  6/1956   Huffines............................ 214/83.3
3,556,327  1/1971   Garrison ............................. 214/82
3,412,532  11/1968  Nickla.............................. 214/83.3
2,552,888  5/1951   Druetta.............................. 100/100

Primary Examiner—Gerald M. Forlenza
Assistant Examiner—Kenneth Noland
Attorney—Lynn G. Foster

[57] ABSTRACT

A compacting hay wagon comprising an accumulator chamber into which hay being gathered is delivered, a compacting chamber communicating with the accumulator chamber, and means interposable between said chambers to permit temporary storage of hay in the accumulator chamber during a compacting operation. Both method and apparatus are disclosed.

7 Claims, 3 Drawing Figures

ACCUMULATING CHAMBER FOR COMPACTING HAY WAGON

BACKGROUND

1. Field of the Invention

This invention relates to hay wagons and is particularly directed to compacting hay wagons which gather and compress hay for storage.

2. Prior Art

As is well known, hay is an essential feed for the livestock industry and, consequently, hay production and storage are important agricultural activities. In some areas, hay is compacted into relatively small bales, weighing approximately 50–100 pounds, which are stacked in barns and sheds for storage and which are removed, as required, for delivery to the livestock. However, in the Western states, where livestock are allowed to roam loose on ranches which often extend over many thousands of acres and where snow may prevent delivery of feed to the livestock, it is customary to gather the hay into large stacks which are stored in situ in the fields. Conventionally, such stacks have been formed by loading the hay onto open wagons or trucks, as it is gathered, and manually unloading the wagons or trucks, with pitchforks and the like, to form a haystack at a desired location. In recent years, compacting hay wagons have been developed wherein loose hay is gathered and delivered into a closed wagon and means are provided where-by, when the wagon is fully charged with loose hay, one or more of the walls of the wagon may be toward each other to compact the loose hay. Thereafter, the process is repeated until the wagon is filled with compacted hay, whereupon the wagon is delivered to a desired location and unloaded, generally by mechanical means, to provide the desired stack. These compacting hay wagons are, obviously, superior to manual operations. However, none of the prior art devices have been entirely satisfactory. Thus, with previous compacting hay wagons, it has been necessary to interrupt the hay gathering operation each time the wagon became fully charged with loose hay, in order to perform the compacting operation. Such interruptions accumulate to constitute a significant loss of time during a hay gathering operation or season. Moreover, hay gathering operations are frequently conducted in a race against time, before an oncoming storm, to prevent the hay from being rained on; since, when wet hay is compacted, it becomes subject to mildew, rotting and spontaneous combustion. The latter is especially dangerous since it can produce fires which can easily consume an entire haystack and may spread to adjacent buildings or range land. Clearly, under these circumstances, any delay is undesirable.

BRIEF SUMMARY AND OBJECTS OF INVENTION

These disadvantages of the prior art are overcome with the present invention and a compacting hay wagon is provided which eliminates interruption of the hay gathering operation during compacting and permits these operations to proceed continuously and simultaneously until the wagon is completely filled with compacted hay. The present invention functions to effectively press the hay for removal of air for improved quality and length of storage capacity.

The advantages of the present invention are preferably attained by providing a compacting hay wagon having an accumulator chamber into which hay being gathered is delivered, a compacting chamber communicating with the accumulator chamber, and means interposable between said chambers to permit temporary storage of hay in the accumulator chamber during a compacting operation.

Accordingly, it is an object of the present invention to provide an improved method of gathering hay.

Another object of the present invention is to provide improved means for gathering hay.

An additional object of the present invention is to provide an improved compacting hay wagon.

A further object of the present invention is to provide a compacting hay wagon which eliminates interruption of the hay gathering operation during the compacting operation.

Another object of the present invention is to provide a compacting hay wagon which permits the hay gathering and compacting operations to proceed continuously and simultaneously until the wagon is completely filled with compacted hay.

A specific object of the present invention is to provide a compacting hay wagon having an accumulator chamber into which hay being gathered is delivered, a compacting chamber communicating with said accumulator chamber, and means interposable between said chambers to permit temporary storage of hay in said accumulator chamber during the compacting operation.

These and other objects and features of the present invention will be apparent from the following detailed description, taken with reference to the accompanying drawings.

DETAILED DESCRIPTION OF ILLUSTRATED EMBODIMENT

Figure 1:
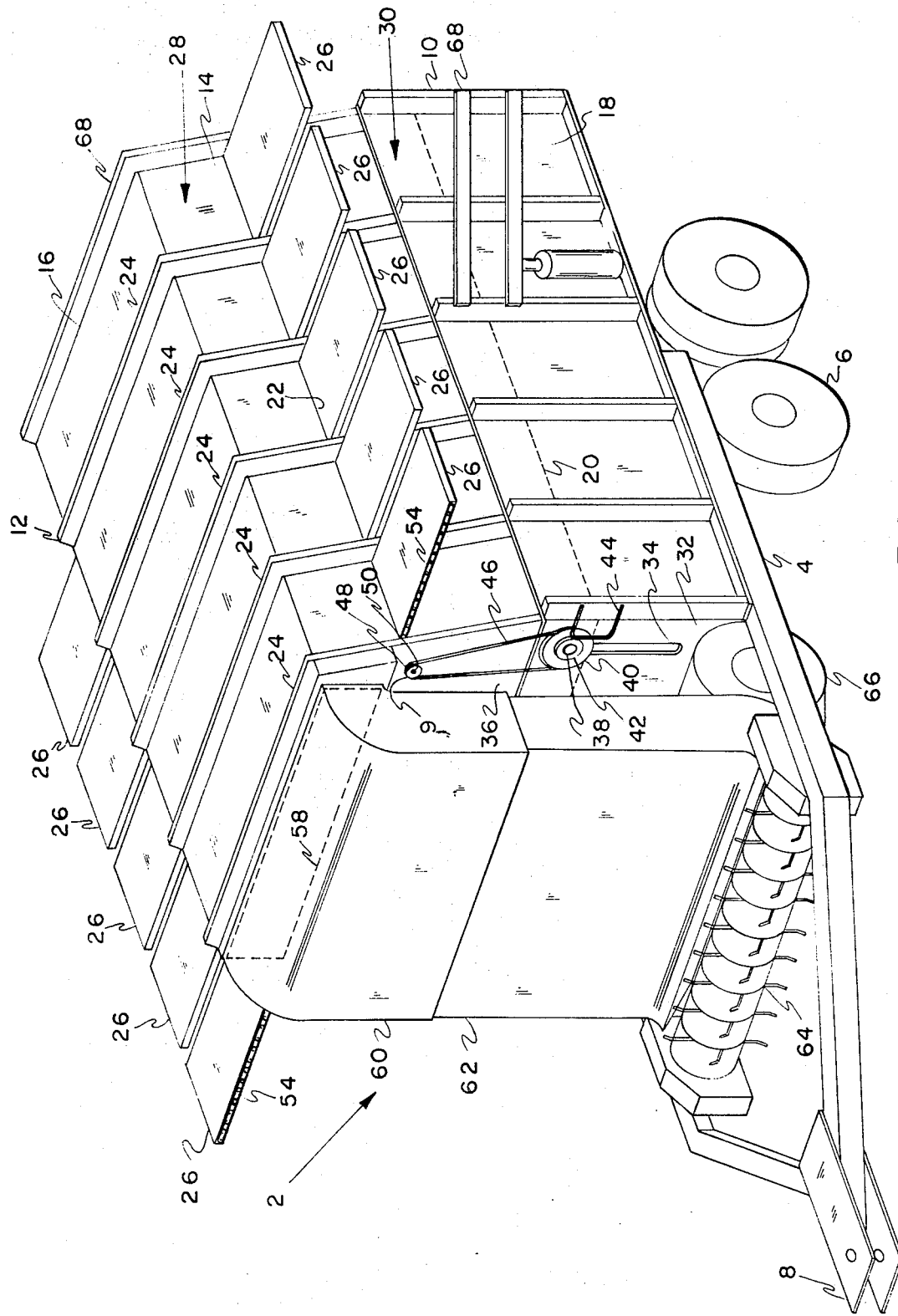
FIG. 1 is an isometric view of a compacting hay wagon embodying the present invention.
Figure 3:
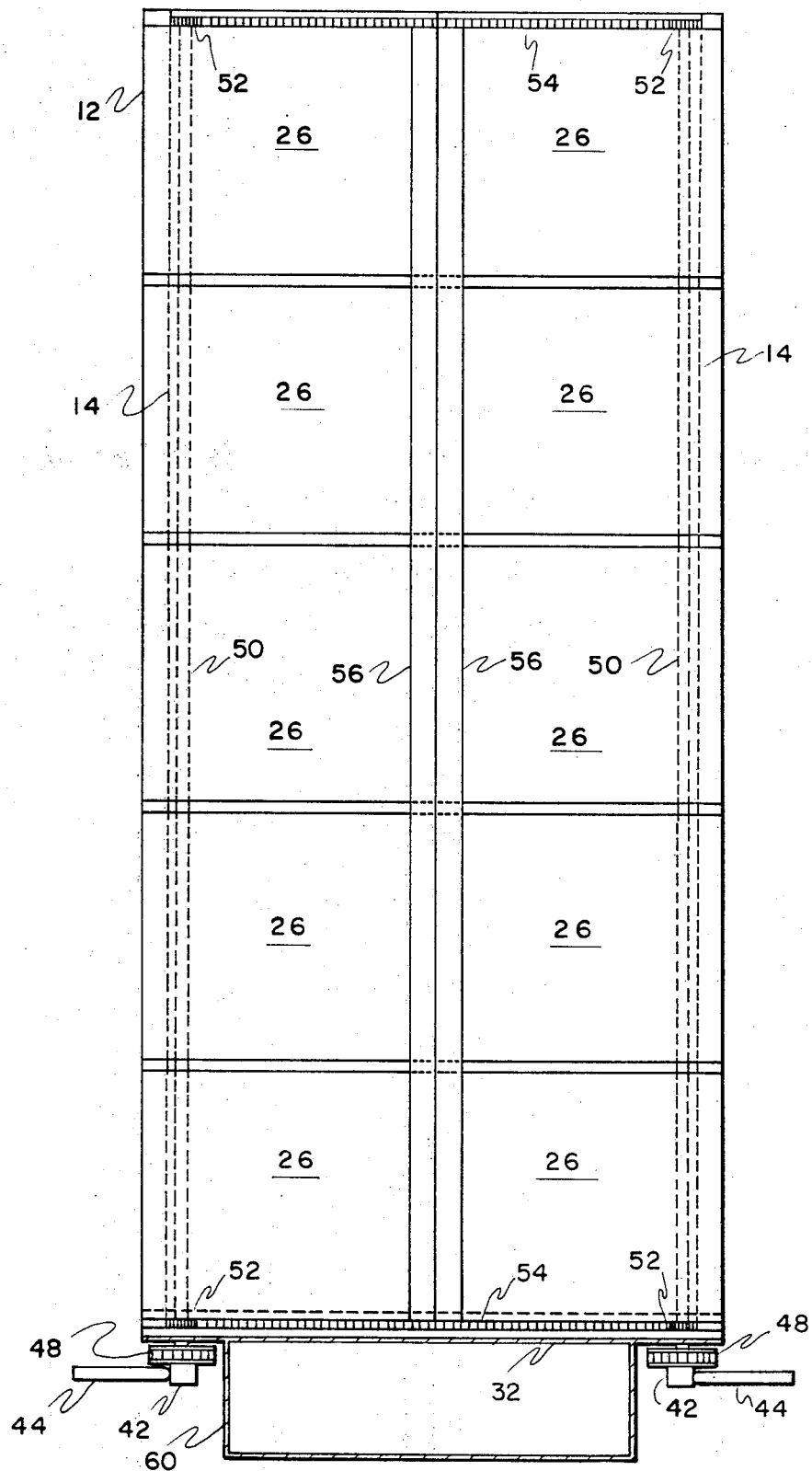
FIG. 3 is a horizontal section taken on the line 3—3 of FIG. 1.

In that form of the present invention chosen for purposes of illustration, FIG. 1 shows a compacting hay wagon, indicated generally at 2, having a frame 4, carried by suitable suspension means 6 and provided with a suitable hitch 8 for coupling the wagon 2 to a tractor or the like. A generally box-like, open-topped receptacle 10 is mounted for vertical, reciprocal movement within the receptacle 10. The compacting head 12 is hollow and is preferably formed in the shape of a truncated pyramid, as seen in FIG. 1. Reciprocating movement of the compacting head 12 may be accomplished by any suitable means, not shown, such as a motor-driven pinion and rack, hydraulic cylinders, or the like. A preferred means for accomplishing such movement is disclosed in my copending patent application, Ser. No. 195,709, filed Nov. 4, 1971. The side walls 14 of the compacting head 12 external downwardly and outwardly from the roof 16 thereof and slidingly engage the side walls 18 of the receptacle 10 below the upper edges of the walls 18, as indicated at 20. In addition, the side walls 14 of the compacting head 12 are each formed with an elongated slot 22 extending horizontally along substantially the entire length thereof. The side walls 14 and roof 16 are provided with a plurality of spaced reinforcing ribs 24 which overlie the slot 22 and a plurality of doors 26 are interposed between the ribs 24 for horizontal movement through the slot 22. In their innermost position, the doors 26 meet centrally of the wagon 2, as best seen in FIG. 3, and serve to divide the interior of the wagon 2 into an upper accumulator chamber, indicated at 28 in FIG. 1, and a lower compacting chamber, indicated at 30 in FIG. 1. The front wall 32 of the receptacle 10 is formed with a pair of elongated slot 34 extending vertically adjacent the opposite edges thereof. The front wall 36 of the compacting head 12 slidably engages the inner surface of front wall 36 of receptacle 10 and carries a pair of shafts 38 which each projects through a respective one of the slots 34 and has a pulley 40 rotatably mounted on the outer end thereof. Rubber wheels 42, or the like, are fixedly secured to the pulleys 40 and are positioned so that, during reciprocation of the compacting head 12, the wheels 42 will frictionally engage respective brackets 44 carried by the receptacle 10 and serve to rotate the pulleys 40. The pulleys 40 are coupled by suitable means, such as cable 46, to drive smaller pulleys 48 and, as best seen in FIG. 3, the pulleys 48 are fixedly mounted on one end of respective shafts 50 which extend the entire length of the compacting head 12. A pair of sprockets 52 are fixed to each of the shafts 50 interiorly adjacent respective ends of the compactor head 12 and drivingly engage chains 54 extending along the adjacent edges of the front and rear horizontally-movable doors 26. As shown, the inner edges of the doors 26 on respective sides of the wagon 2 are connected by bars 56 or the like. Thus, movement of the front and rear doors 26 will act through bars 56 to cause simultaneous movement of all of the doors 26 connected thereby. Alternatively, if desired, sprockets 52 and chains 54 could be provided for each of the doors 26.

To permit delivery of hay into the wagon 2, an opening 58 is formed in the front wall 36 of the compacting head 12 communicating with the accumulator chamber 28 above the doors 26. Obviously, any desired means may be employed for delivering hay through opening 58 to the interior of the wagon 2. Preferably, however, a chute 60 is secured to the front wall 36 of the compacting head 12 enclosing the opening 58 and extending forwardly and downwardly therefrom into telescoping relation about a second chute 62 which cooperates with rotary rake 64 and blower 66 to form a pneumatic delivery system, as shown and described in my copending patent application, Ser. No. 195,549, filed Nov. 4, 1971. To permit unloading of compacted hay from the wagon 2, suitable doors 68 are provided on the rear ends of the receptacle 10 and compacting head 12 and any appropriate means may be provided for opening the doors 68 and removing the hay.

Figure 2:
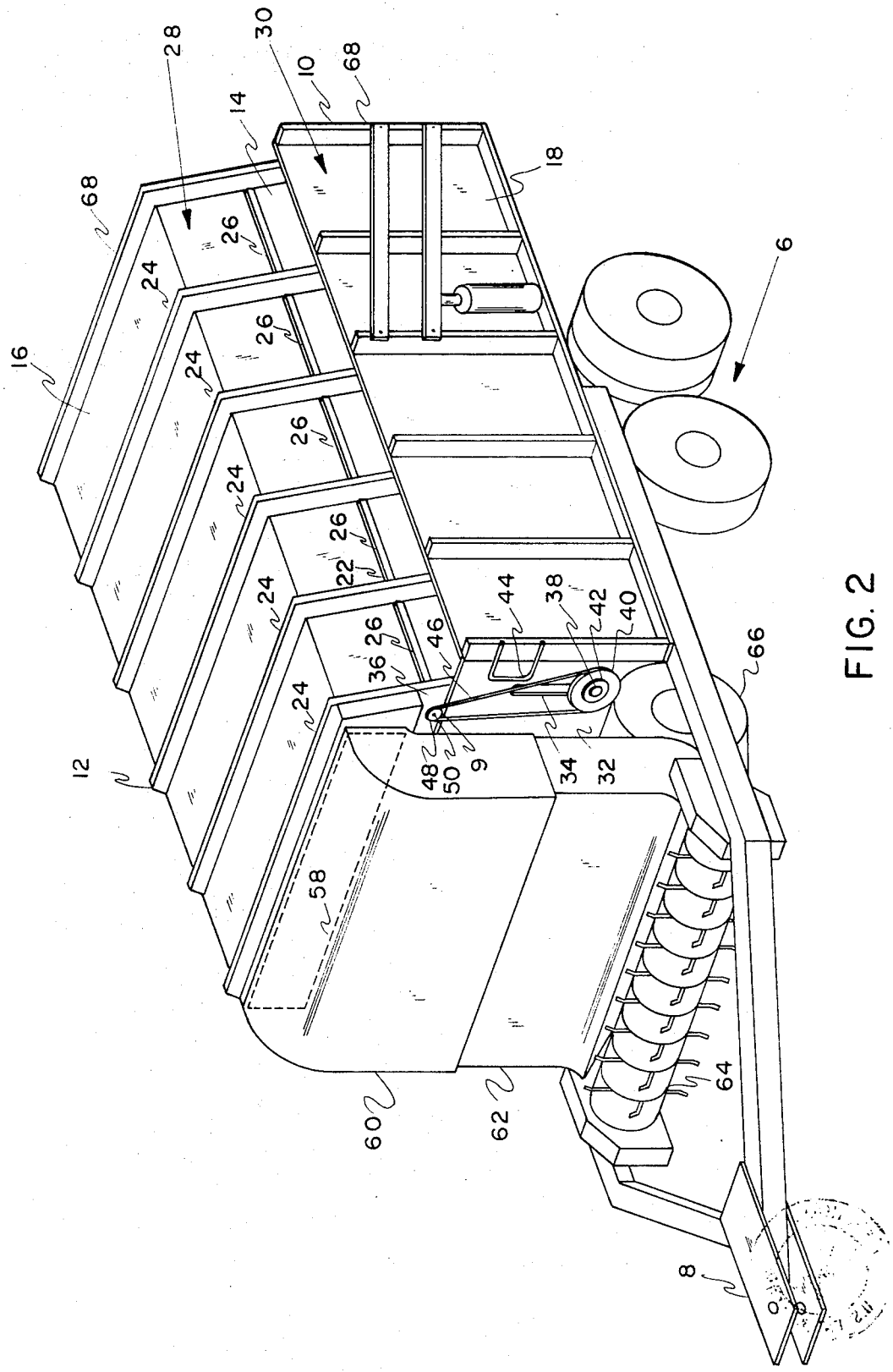
FIG. 2 is an isometric view showing the wagon of FIG. 1 during the compacting operation.

In use, a tractor or the like, not shown, is connected to hitch 8 and the wagon 2 is towed through a field of cut hay. As this is done, rake 64 picks up the hay and supplies it to duct 62. Air from blower 66 carries the hay through ducts 60 and 62 and delivers the hay through opening 58 into the interior of the wagon 2. Initially, the compactor head 12 is in the raised position and the doors 26 are extended, as seen in FIG. 1. Consequently, hay delivered through opening 58 will pass through the accumulator chamber 28 and will fall into the compacting chamber 30 within receptacle 10. When a suitable amount of hay has been deposited within the compacting chamber 30, the reciprocating mechanism is actuated to drive the compacting head 12 downward within receptacle 10 to the position shown in FIG. 2. As the compacting head 12 moves downward, the shafts 38 are traversed downwardly along slots 34, causing rubber wheels 42 to frictionally engage brackets 44 and serving to rotate the pulleys 40 in a counter-clockwise direction, as seen in FIG. 1. Rotation of the pulleys 40 acts through cables 46 to rotate pulleys 48 and, hence, shafts 50 and sprockets 52. The sprockets 52 engage chains 54 and serve to drive the doors 26 inwardly, to the position shown in FIG. 3, and to separate the accumulator chamber 28 from the compacting chamber 30. Thereafter, continued downward movement of the compacting head 12 causes the doors 26 and the walls 14 of the compacting head 12 to engage and compress the hay in the compacting chamber 30. Meanwhile, loose hay continues to be delivered into the accumulator chamber 28 above doors 28, through opening 58 and chute 60 which descends telescopically about chute 62 as the compacting head 12 is moved downward. Upon completion of the compacting operation, the compacting head 12 is returned to the raised position, shown in FIG. 1. As the compacting head 12 moves upward, the wheels 42 again frictionally engage the brackets 44 and, in this instance, serve to rotate the pulleys 40 in a clockwise direction, as seen in FIG. 1. This rotation is transmitted by the cables 46, pulleys 48 and shafts 50 to the sprockets 52 which engage chains 54 to drive the doors 26 outward to the positions shown in FIG. 1. When this occurs, the loose hay, which has been delivered into the accumulator chamber 28 falls into the compacting chamber 30 on top of the previous charge of hay which was compressed during the compacting operation. This cycle of operation is repeated, without interruption, until the volume of compressed hay completely fills the compacting chamber, whereupon the wagon 2 is delivered to a desired location and the compacted hay is unloaded through rear doors 68.

Obviously, numerous variations and modifications may be made without departing from the present invention. Accordingly, it should be clearly understood that the form of the present invention described above and shown in the accompanying drawing is illustrative only and is not intended to limit the scope of the invention.

What is claimed is:

1. A crop wagon comprising:
   a crop pick up and delivery section comprising means capable of continuously picking up influent crop from a field and means continuously elevating the influent crop;
   a receptacle having a floor into which influent crop is passed and where compaction of the crop is accomplished;
   a crop compaction section interposed between the output of the crop elevating means and the receptacle at an elevation above the floor comprising means for engaging and compressing the crop disposed upon the floor and means for successively lowering and elevating the engaging means;
   a crop accumulation means comprising means upon which influent crop is temporarily stored as the crop engaging means are being lowered and elevated and means displacing said temporary crop storing means from a remote disposition to a disposition in line with the path of the crop between the continuously elevating means and the floor of the receptacle whereby influent crop comes to rest upon the temporary crop storing means during movement of the crop engaging means and the temporarily stored crop is discharged to the receptacle when the engaging means are elevated and idle.

2. The crop wagon of claim 1 wherein
the receptacle is open-topped, and
the engaging means comprises a compacting head formed in the shape of a hollow, truncated pyramid.

3. The crop wagon of claim 2 wherein:
said elevating means comprises means for reciprocating said compacting head within said receptacle.

4. The crop wagon of claim 3 wherein:
said crop accumulation means comprise door means which are reciprocable with said compacting head.

5. A loose crop wagon comprising:
means for continuously picking up crop in a row upon the ground,
a receptacle for receiving loose crop comprising a floor and side walls defining a compacting chamber, and an accumulator chamber disposed above the compating chamber,
expandable and retractable means for elevating the crop above the compacting chamber and discharging the crop at least partially by force of gravity into the receptacle,
the accumulator chamber being located substantially above the floor of the receptacle into which picked up crop is discharged from the elevating means,
the compacting chamber normally openly communicating with said accumulator chamber,
means which are vertically reciprocated for compacting hay in the compacting chamber, and
means selectively interposable between said chambers to close said communication and to permit temporary storage of crop in said accumulator chamber above the compacting chamber during reciprocation of the compacting means.

6. A hay wagon comprising:
a generally box-like, open-topped receptacle,
a compacting head in the form of a hollow, truncated pyramid mounted for vertical reciprocal motion within said receptacle and having an elongated slot extending horizontally substantially the entire length of the side walls of said pyramid,
a pair of door means each movable horizontally through the slot on a respective side of said compacting head between a first position dividing the interior of said wagon into upper and lower chambers and a second position communicating said chambers,
actuating means moving said door means to said first position upon downward movement of said compacting head and moving said door means to said second position upon upward movement of said compacting head, and
means for delivering hay into said upper chamber.

7. A method of forming a compacted stack of crop in a wagon comprising the steps of:
a. continuously picking up, elevating and delivering crop to the wagon;
b. causing the delivered crop to come to rest in a stack on the bottom of the wagon;
c. interrupting said step (b) while compacting said stack and at the same time temporarily accumulating the continuously delivered crop at a station above the stack;
d. thereafter releasing the accumulated crop and causing the accumulated crop to come to rest upon the stack and resuming step (b).

* * * * *